R. SAPPELT.
Seed and Guano Distributer.

No. 163,108.  Patented May 11, 1875.

WITNESSES:

INVENTOR:
Robert Sappelt
BY
ATTORNEYS.

UNITED STATES PATENT OFFICE.

ROBERT SAPPELT, OF SPRINGFIELD, NEW YORK.

IMPROVEMENT IN SEED AND GUANO DISTRIBUTERS.

Specification forming part of Letters Patent No. 163,108, dated May 11, 1875; application filed January 25, 1875.

*To all whom it may concern:*

Figure 1:
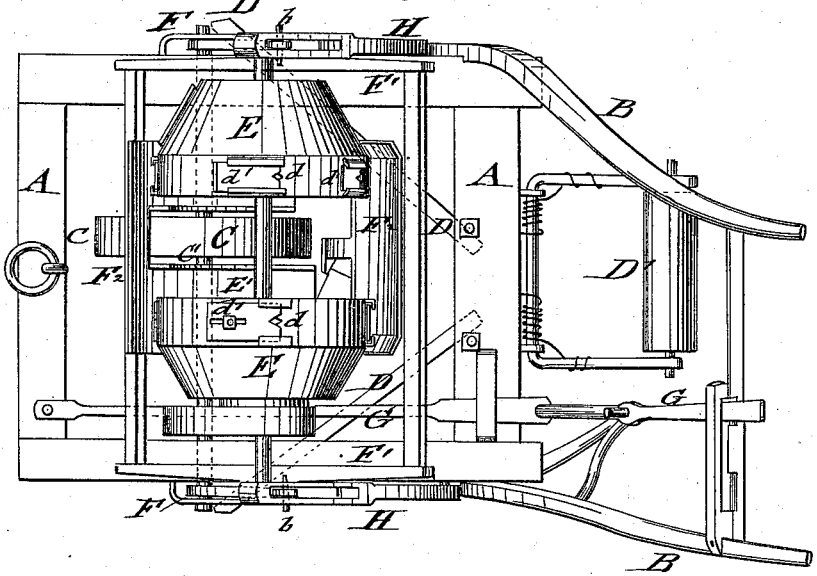
Figure 2:
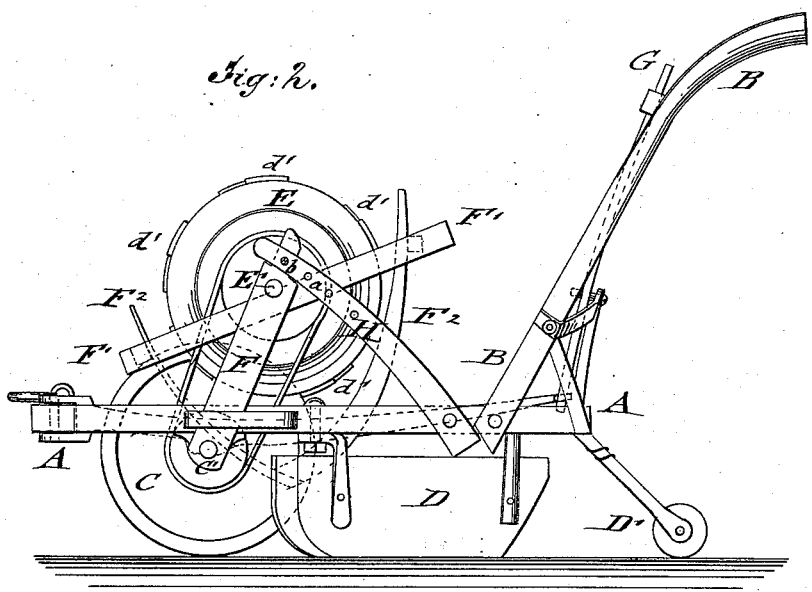

Be it known that I, ROBERT SAPPELT, of Springfield, Queens county, New York, have invented a new and Improved Seed and Guano Distributer, of which the following is a specification:

Figure 1 represents a top view of my seed and guano distributer, and Fig. 2 is a side elevation of the same.

Similar letters of reference indicate corresponding parts.

The invention will first be fully described, and then pointed out in the claim.

In the drawing, A represents the main frame of my seed and guano distributer, which is drawn by one or two horses, according to its size, and controlled by operating-handles B, at its rear part. Frame A is supported on the axle C' of the large wheel C, which is placed midway in frame A near the front part of the same, and intended to run in the furrow in which the seed and fertilizer are to be deposited. Cover-boards D, which are adjustable to greater or lesser width, extend at suitable angle from the sides of frame A to the rear part, and serve, together with a rear spring-roller, D', to throw the earth over the seed in the usual manner, after the same has been dropped by the distributing device.

The distributing-drums E are secured sidewise of each other on a lateral shaft, E', which turns in bearings of side pieces F, and are revolved by suitable gearing, belts, or chains from the wheel-axle C', being thrown in and out of gear therewith by a springclutch of the wheel-axle, which is connected, by operating-lever mechanism G, with the handles at the rear part, for producing the instant interruption of the revolving motion of the drums and the dropping of the seed.

The lever-mechanism G is set by a rack arrangement of the handles in the required position for causing the throwing in and out of gear of the drum-revolving parts, and giving thereby the full control over the depositing of the seed and guano. A lateral frame, F¹, is rigidly attached to the side pieces F, for the purpose of supporting the seed-conveying guard-plate F², which is provided with separate spouts for the seed and guano, so that the same are not deposited at the same point, but at a short distance from each other, it being more advantageous when the fertilizer is mixed with the covering earth around the seed, and not in immediate contact therewith.

The side pieces F are attached with their lower ends to the axle C', and secured with their upper ends in slotted arc-shaped guide-arms H, being adjusted by perforations *a* and cross-pins *b* of the slotted arms at any angle to frame A, so that the drums may be placed in position above the supporting-wheel C, or back of the same. The weight of the drums is thereby thrown more or less on the covering-boards, and the spreading of a greater or smaller quantity of earth on the seed assisted and regulated thereby. The drums E are provided at their circumference with apertures *d*, having sliding gates and clamp-screws *d'*, by which the discharge-opening of the apertures is readily adjusted, according to the size and quantity of seed or fertilizer to be distributed. Hinged or sliding lids of the drums admit the ready filling of the same with seed or fertilizer after the contents are discharged. Either one of the drums may be used without the other by closing the distributing-apertures entirely. The regular dropping of the seed is secured, as any choking of the apertures, which forms an objectionable feature of many seed-drills, is prevented by the continual rotation of the drums, and the ease with which any closed up aperture may be discovered. This accidental choking may be remedied in an instant, so that the failure of the drums to drop the seed or guano in regular manner is limited to an occasional non-discharge of one hole merely, without extending to the whole furrow, as is the case with other seed-distributers in use.

Having thus described my invention, I claim as new and desire to secure by Letters Patent—

The revolving drums E E, and seed-conveyer F², mounted on frame F¹, in combination with pivoted standards F, and adjusting-arms H, as and for the purpose specified.

ROBERT SAPPELT.

Witnesses:
PAUL GOEPEL,
T. B. MOSHER.